United States Patent
Patel et al.

(10) Patent No.: US 11,429,993 B2
(45) Date of Patent: Aug. 30, 2022

(54) SYSTEMS AND METHODS FOR GAMIFICATION-BASED ENGAGEMENT

(71) Applicant: JPMORGAN CHASE BANK, N.A., New York, NY (US)

(72) Inventors: Shuchi Patel, Frisco, TX (US); Kristie Isom, Frisco, TX (US); John Robert Clem, New York, NY (US); Edgar A. Verchot, III, Marysville, OH (US); Gerardo Gean, Lewisville, TX (US); Konstandina Demerell, Dexter, MI (US); Sanjay Patel, Mickleton, NJ (US); Raghuram Vudathu, Downingtown, PA (US); Julia Elyasheva, Woodmere, NY (US); David Christopher Carey, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/545,566

(22) Filed: Aug. 20, 2019

(65) Prior Publication Data
US 2020/0058045 A1 Feb. 20, 2020

Related U.S. Application Data (60) Provisional application No. 62/719,960, filed on Aug. 20, 2018.

(51) Int. Cl.
*G06Q 30/02* (2012.01)
*G06N 20/00* (2019.01)

(52) U.S. Cl.
CPC ......... *G06Q 30/0209* (2013.01); *G06N 20/00* (2019.01); *G06Q 30/0224* (2013.01)

(58) Field of Classification Search
CPC ........... G06Q 30/0209; G06Q 30/0234; G06Q 30/0244; G06Q 30/0207; G06Q 30/0224; G06Q 30/0239; G06N 20/00
(Continued)

(56) References Cited

U.S. PATENT DOCUMENTS 9,727,882 B1 * 8/2017 Huntwork ........... H04L 43/0876
9,832,159 B1    11/2017 Kursun et al.
(Continued)

FOREIGN PATENT DOCUMENTS

WO    WO-2017207100 A1 * 12/2017

OTHER PUBLICATIONS

Trademark Electronic Search System (TESS), Ada, Jul. 22, 2020 (Year: 2020).*
(Continued)

*Primary Examiner* — Tarek Elchanti
(74) *Attorney, Agent, or Firm* — Greenberg Traurig LLP (57) ABSTRACT

Systems and methods for gamification-based engagement are disclosed. In one embodiment, in an information processing apparatus comprising at least one computer processor, a method for gamification-based engagement, may include: (1) receiving, from a plurality of data sources, customer activity data comprising customer behavioral data and customer transactional data for a plurality of customers; (2) generating a dynamic customer profile for each of the customers based on the customer activity data and the customer transactional data; (3) retrieving challenge data for a challenge comprising an identification of a plurality of tasks to be completed, an order in which the tasks are to be completed, and an incentive for completing the tasks; (4) dynamically matching one of the customers to the challenge; (5) issuing the challenge to the customer; (6) tracking the customer's response to the challenge; and (7) updating the (Continued)

customer's dynamic customer profile based on the customer's response.

7 Claims, 2 Drawing Sheets

(58) Field of Classification Search
USPC .................................. 705/14.12, 14.1, 14.54
See application file for complete search history.

(56) References Cited

U.S. PATENT DOCUMENTS

| | | | |
|---|---|---|---|
| 2008/0270240 A1* | 10/2008 | Chu | G06Q 30/0239 705/14.11 |
| 2011/0066577 A1* | 3/2011 | Van Gael | G06N 20/00 706/12 |
| 2011/0295687 A1* | 12/2011 | Bilenko | G06Q 30/0256 705/14.54 |
| 2012/0143952 A1* | 6/2012 | von Graf | G06Q 10/10 709/204 |
| 2013/0030887 A1* | 1/2013 | Calman | G06Q 40/02 705/14.14 |
| 2015/0032519 A1* | 1/2015 | Brooks | G06Q 30/0209 705/14.12 |
| 2015/0220999 A1 | 8/2015 | Thornton et al. | |
| 2017/0091823 A1 | 3/2017 | Adinarayan et al. | |
| 2017/0103425 A1* | 4/2017 | Christofi | G06Q 30/0255 |
| 2017/0109776 A1* | 4/2017 | Marshak | G06Q 10/087 |
| 2017/0189814 A1* | 7/2017 | Ventrice | A63F 13/46 |
| 2017/0220926 A1* | 8/2017 | Chhabra | G06N 7/005 |
| 2017/0315767 A1* | 11/2017 | Rao | G06Q 30/06 |
| 2018/0047047 A1* | 2/2018 | Joyson | G06Q 30/0234 |
| 2018/0232762 A1* | 8/2018 | Greene | G06Q 30/0255 |
| 2019/0091567 A1* | 3/2019 | Huffman | A63F 13/67 |
| 2019/0189024 A1* | 6/2019 | Chaganti | G06Q 10/06311 |

OTHER PUBLICATIONS

Trademark Electronic Search System (TESS), Pascal, Jul. 22, 2020 (Year: 2020).*
Trademark Electronic Search System (TESS), Prolog, Jul. 22, 2020 (Year: 2020).*
Trademark Electronic Search System (TESS),Visual Basic, Jul. 22, 2020 (Year: 2020).*
Trademark Electronic Search System (TESS), Javascript, Jul. 22, 2020 (Year: 2020).*
Merriam-Webster, Order, Jul. 24, 2020 (Year: 2020).*
Merriam-Webster, Circumstantial, Jul. 24, 2020 (Year: 2020).*
Oriana Bandiera, Matching Firms, Managers, and Incentives, 2015 (Year: 2015).*
International Search Report, dated Nov. 15, 2019, from corresponding International Application No. PCT/US2019/047229.
Written Opinion of the International Searching Authority, dated Nov. 15, 2019, from corresponding International Application No. PCT/US2019/047229.

* cited by examiner

SYSTEMS AND METHODS FOR GAMIFICATION-BASED ENGAGEMENT

RELATED APPLICATIONS

This application claims priority to, and the benefit of, U.S. Provisional Patent Application Ser. No. 62/719,960, filed Aug. 20, 2018, the disclosure of which is hereby incorporated, by reference, in its entirety.

1. FIELD OF THE INVENTION

The present disclosure generally relates to systems and methods for gamification-based engagement.

2. DESCRIPTION OF THE RELATED ART

Customers are often provided with offers for a reward in exchange for doing something. For example, a customer may receive reward points if he or she signs up for a co-branded credit card and conducts a certain dollar amount of transactions within a certain period of time. These types of offers and rewards, however, generally target a single action that may not consider a certain customer's profile.

SUMMARY OF THE INVENTION

Systems and methods for gamification-based engagement are disclosed. In one embodiment, in an information processing apparatus comprising at least one computer processor, a method for gamification-based engagement, may include: (1) receiving, from a plurality of data sources, customer activity data comprising customer behavioral data and customer transactional data for a plurality of customers; (2) generating a dynamic customer profile for each of the customers based on the customer activity data and the customer transactional data; (3) retrieving challenge data for a challenge comprising an identification of a plurality of tasks to be completed, an order in which the tasks are to be completed, and an incentive for completing the tasks; (4) dynamically matching one of the customers to the challenge; (5) issuing the challenge to the customer; (6) tracking the customer's response to the challenge; and (7) updating the customer's dynamic customer profile based on the customer's response.

In one embodiment, the method may further include issuing the customer a reward based on the incentive for completing the challenge.

In one embodiment, the method may further include updating the challenge data based on the customer's response.

In one embodiment, the customer behavioral data may include data representing a customer's interaction with a computer application or a website, data representing a customer's use of a product or service, etc.

In one embodiment, the dynamic customer profile may be further based on a circumstantial data.

In one embodiment, machine learning may identify a weighting to give to the customer transactional data and to the customer behavioral data.

In one embodiment, the challenge data may be automatically generated based on a customer behavior to encourage. The customer behavior to encourage may be the use of a feature in a mobile application or a website, the use of product or service, etc.

In one embodiment, machine learning may to predict an incentive that encourages the customer behavior.

In one embodiment, at least one of a number of tasks to be completed, the order in which the tasks are to be completed, and the incentive may be specific to the customer.

In one embodiment, the step of dynamically matching one of the customers to the challenge may include using machine learning to identify the customer to match to the challenge.

In one embodiment, the challenge may be issued to the customer's mobile device or via a website.

In one embodiment, the customer may be notified of the challenge after the plurality of tasks are completed in the order.

In one embodiment, the customer's response to the challenge may include at least one of a customer time spent reviewing the challenge, acceptance or rejection of the challenge, an action taken prior to responding to the challenge, and an action taken after responding to the challenge.

In one embodiment, the step of updating the customer's dynamic customer profile based on the customer's response may include adjusting a weighting for the customer transactional data and the customer behavioral data.

According to another embodiment, a system for gamification-based engagement may include a plurality of data sources, each of the data sources providing customer activity data, at least one customer device, a challenge database, and a computer processor executing a computer program. The computer program may perform the following: (1) receive, from the plurality of data sources, customer activity data comprising customer behavioral data and customer transactional data for a plurality of customers; generate a dynamic customer profile for each of the customers based on the customer activity data and the customer transactional data; retrieve challenge data for a challenge from the challenge database comprising an identification of a plurality of tasks to be completed, an order in which the tasks are to be completed, and an incentive for completing the tasks; dynamically match one of the customers to the challenge; issuing the challenge to the customer electronic device; track the customer's response to the challenge; and update the customer's dynamic customer profile based on the customer's response.

In one embodiment, the customer behavioral data may include data representing a customer's interaction with a computer application or a website, or data representing a customer's use of a product or service.

In another embodiment, machine learning may identify a weighting to give to the customer transactional data and to the customer behavioral data.

In one embodiment, the challenge data may be automatically generated based on a customer behavior to encourage, the customer behavior to encourage comprising at least one of use of a feature in a mobile application or a website, or use of product or service.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are generally directed to systems and methods for gamification-based engagement. For example, gamification may be used to engage a customer with an organization's products, services, etc. including an organization's mobile application, website, in-person features, etc. For example, a financial institution's customer may be provided with a list of a plurality of activities (e.g., 5-10 activities) to be performed using the financial institution's mobile payment application, on the financial institution's website, on a rewards website, on a partner website, etc. When the user completes the requisite number of activities, the user may be rewarded, such as with a discount, reward points, badge(s), etc.

In embodiments, different gamification constructs may be targeted to different customer segments. For example, different constructs that require different sets activities may be tailored to what a specific customer segment does or does not do, and may be used a way to expose that target customer segment to try other things. Examples of different customer segments include new users versus power users, a customer segment that primarily uses the mobile payment application for online payments only, but not for fuel purchases.

Although many examples herein are in the context of the customer being an end user or a consumer, it should be recognized that a customer may be a company, a merchant, a reseller, or any other suitable entity.

Figure 1:
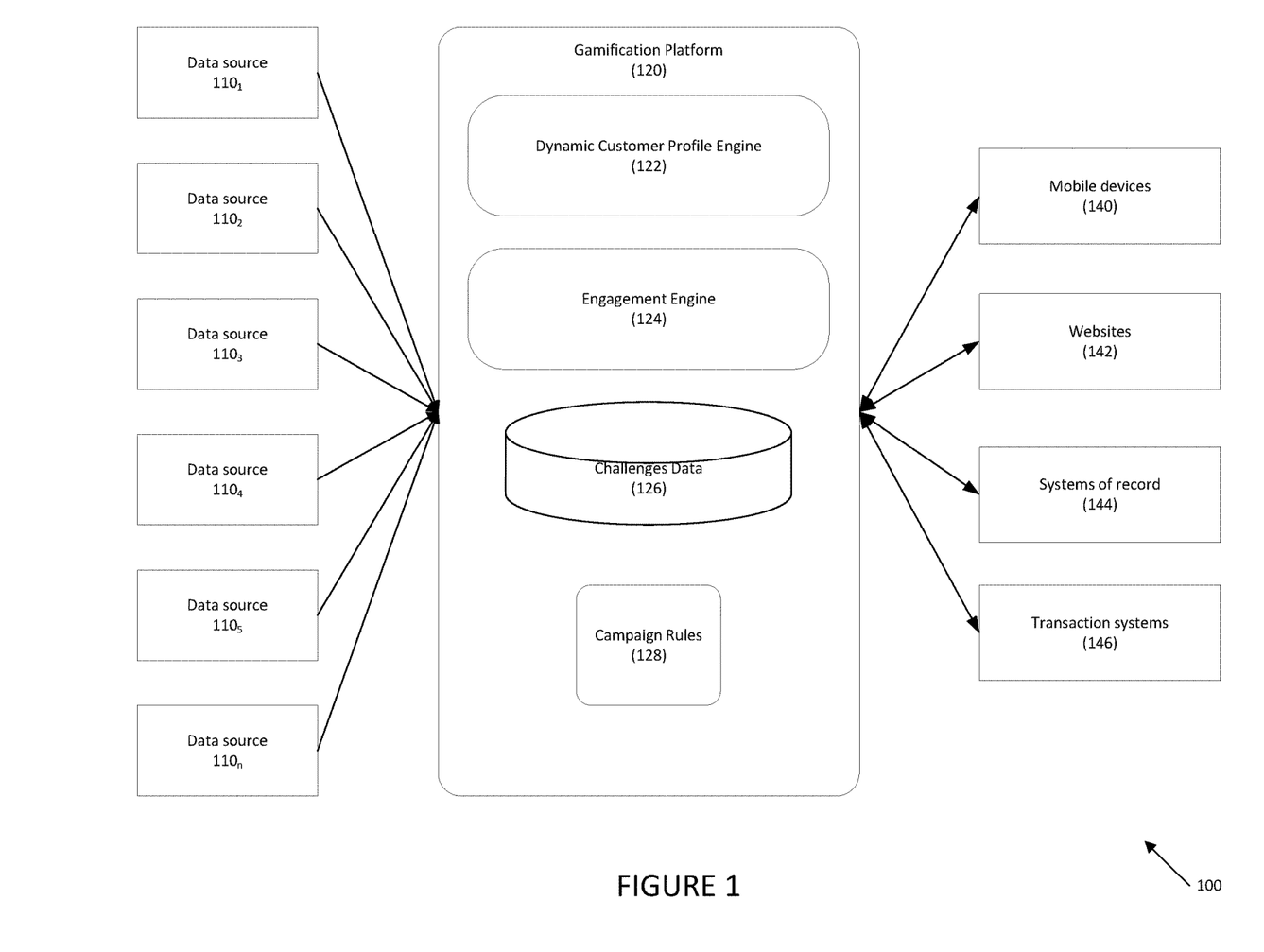
FIG. 1 depicts a system for gamification-based engagement according to one embodiment.

Referring to FIG. 1, system 100 may include a plurality of data sources 110. Data sources $110_1 \ldots 110_n$ may provide transactional or behavioral data, and may include internal sources, external sources, etc. Examples of data sources 110 may include customer transaction history, customer profile information, customer account information (e.g., mortgage, auto, credit, savings, DDA, etc.), social media feeds, customer behavior data (e.g., prior interactions with the organization's mobile application, website, or other services), etc. In one embodiment, environmental information data sources, such as season, day of the week, day in the month, weather, etc. may be included as is necessary and/or desired.

System 100 may further include gamification platform 120, which may be provided on one or more computer processors, in the cloud, etc. Gamification platform 120 may include, dynamic customer profile engine 122, engagement engine 124, challenges data database 126, and campaign rules 128.

Dynamic customer profile engine 122 may receive data from data sources $110_1 \ldots 110_n$ and may aggregate this data to generate a dynamic profile for the customer. For example, the customer's transactions, the customer's accounts, the customer's profile, etc. may be used to generate a dynamic customer profile that may be used to group the customer with similar customers.

Examples of customer segments include customers within a certain geographical region, that use a specific product, that share a common past behavior, of a common demographic, etc. In one embodiment, customer segmentation may be identified by a machine learning algorithm.

In one embodiment, the dynamic customer profile may be updated periodically (e.g., hourly, daily, weekly, monthly, etc.), on demand (e.g., when an engagement campaign starts), or as otherwise necessary and/or desired.

In one embodiment, the dynamic customer profile may vary with the time of day, day of the week or month, seasons, customer event dates (e.g., birthdays, anniversaries, trips, etc.).

Challenges data 124 may include data that defines challenges for a customer engagement campaign. In one embodiment, challenges may include one or more tasks to be completed by the customer. The tasks may be arranged in a certain order (e.g., milestones). For example, tasks may be required to be performed in a certain order, such as turning on push notifications and then completing five order-ahead transactions.

In one embodiment, machine learning may be used to predict behaviors that influence the principles governing the challenge.

Campaign rules 128 may specify rules for a customer engagement campaign. For example, campaign rules 128 may specify the type of engagement behavior (e.g., use of a mobile application, website, good or service, etc.), a target dynamic customer profile or portions thereof, etc.

In one embodiment, the rules may depend on business objectives, use cases, etc. For a given challenge, the rules may define the parameters of the challenge, and may be used to aid in the personalization of the challenge. Examples include the tasks to complete, a start and end date, a post action that triggers the next milestone, a location for a transaction, whether the transaction is visible to or hidden from the user, etc. The rules may also define an incentive type, an amount of the incentive, a frequency of the incentive, etc. They may also define a communication type, a frequency of communication, a timing of communications, etc.

Engagement engine 124 may receive dynamic customer profiles from dynamic customer profile engine 122, challenges data from challenges data database 126, and customer engagement campaign rules 128 from campaign rules 128, and may identify one or more customers to issue a customer engagement challenge. The customer engagement challenge may be presented to a customer's mobile device 140 (e.g., by SMS, push notification, in-app notification, email, etc.), to a customer account via the organization's website 142, etc. In one embodiment, the customer engagement challenge may be provided to internal systems (e.g., systems of record 144, transaction systems 146, etc.).

The customer engagement challenge may drive "stickiness" or customer retention, as well as new customer acquisition. It may provide customers—both new and existing—with an engaging way to learn about an organization's products. In embodiments, a combination of a game's mechanics and motivations, the appeal of the tasks presented, and the quality of the targeting all play into how effective the challenge is.

Figure 2:
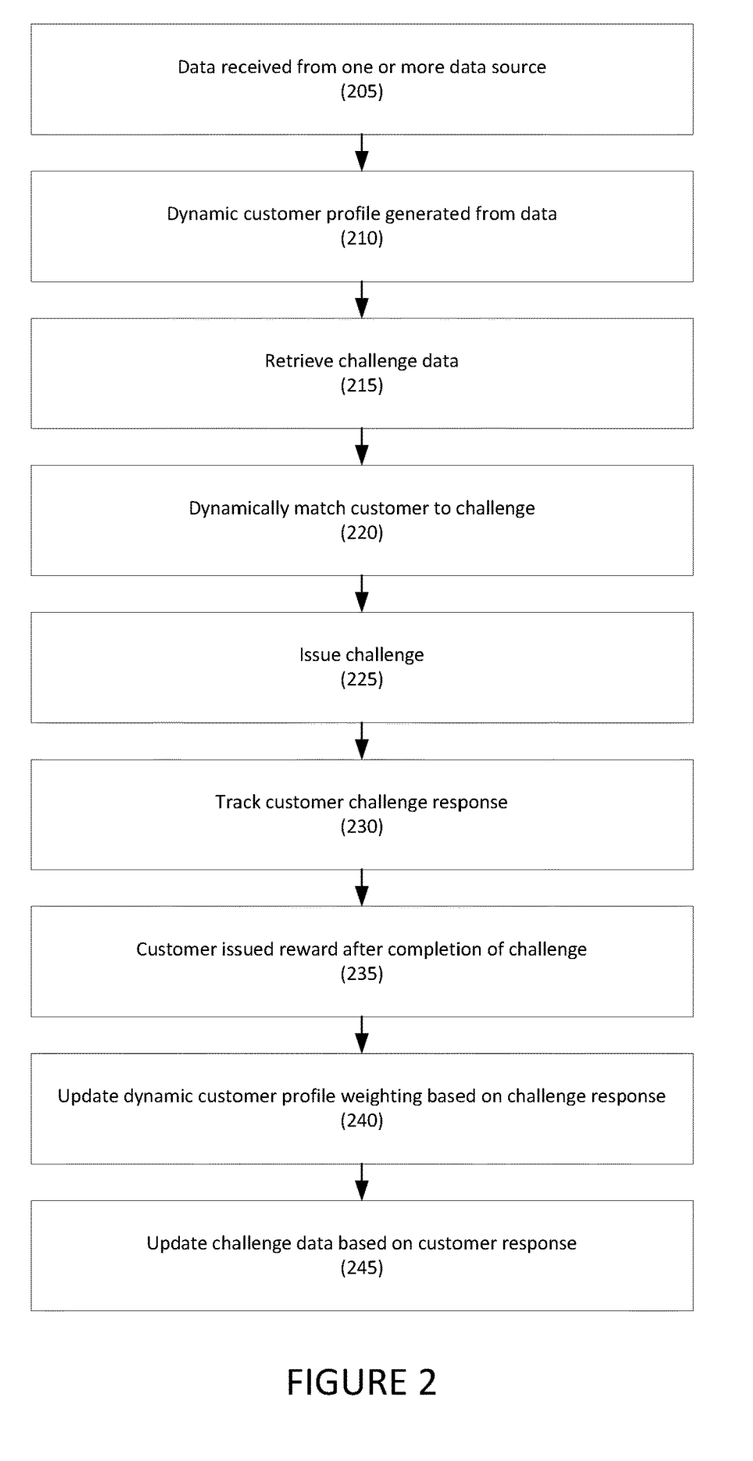
FIG. 2 depicts a method for gamification-based engagement according to one embodiment.

Referring to FIG. 2, a method for gamification-based engagement is disclosed according to one embodiment.

In step 205, data may be received from one or more data source. In one embodiment, the data may include transactional or behavioral data, and may include internal source, external sources, etc. Examples of transactional data may include past purchases, mortgage history, credit card history, savings history, etc. Examples of behavioral data may include past interaction with a mobile application or website (e.g., features used, features not used, etc.), use of products or services offered, etc.

In step 210, a dynamic customer profile may be generated for the customers from the received data. For example, the dynamic customer profile may be based on the customer transactional data and the customer behavioral data. In one embodiment, the dynamic customer profile may be further based on customer profile information, customer account information, social media feeds, etc. In one embodiment, circumstantial data sources, such as those that provide time/date/season information, weather information, customer location information, etc. may be included as is necessary and/or desired.

The data that is used in the generation of the dynamic customer profile may vary as is necessary and/or desired. In one embodiment, the data that is used may be specified by an engagement campaign goal or objective.

In one embodiment, machine learning may be used to identify the data that is used to generate the dynamic customer profiles.

In step 215, challenge data may be retrieved. In one embodiment, the challenge data may specify the tasks to be completed, how the tasks are to be completed, an order in which the tasks are to be completed (e.g., milestones), etc. In one embodiment, the tasks and/or milestones may be manually defined; in another embodiment, the tasks and/or milestones may be automatically generated based on an engagement campaign goal or objective, such as introducing a customer to a new feature in a mobile application.

In one embodiment, the challenges and/or tasks may be related to non-spending related activities, such as the use of a mobile payment application functionalities (e.g., linking the mobile payment application to a third-party wallet, exploring discounts, etc.).

The identity and/or number of the challenges and/or the number of tasks in a challenge may be randomly selected for each customer; may be randomly selected for a plurality of customers, or may be determined based on a customer portfolio, customer usage of the mobile payment application, etc. For example, customer A may have the items in a challenge, while customer B may have five. Similarly, customer A may receive 500 points for completing a challenge, while customer B may receive a badge.

For example, challenges and/or tasks may include one or more of ordering ahead, paying with points, paying at the gas pump with a payment application, linking an account to an electronic wallet, adding a loyalty card, a certain dollar amount of transactions, a certain number of transactions, adding loyalty cards, provisioning a credit cards to a payment application, using merchant loyalty card, paying with NFC, combinations thereof, etc.

For example, if a customer began to set up a transaction using the mobile payment application (e.g., the customer initiated a lunch order with a restaurant) but abandoned the transaction, the customer may be provided a challenge based on the abandoned transaction at a relevant time period, such as lunchtime the next day. Other spending patterns, and mobile payment application activities, may be used as is necessary and/or desired.

As another example, a customer may be informed of past and/or current transactions conducted without using the mobile payment application that could have resulted in a benefit. For example, if a customer used a credit card for a transaction, but could have earned a reward (e.g., discount, reward points, etc.) with the mobile payment application, the customer may be sent a message informing the customer of such, and a challenge may be issued consistent with this.

In one embodiment, challenges may be based on the location of the customer. For example, when it is determined that the customer is within a certain distance of a merchant, the customer may be sent a challenge to be used with the merchant. In one embodiment, the offers may only be sent to customers with a certain relevance score with the merchant, such as customers that have purchased from the merchant in the past, have expressed an interest in the merchant, etc.

In one embodiment, the challenges may be timely and personalized for the customer. When people are engaged with targeted location-based marketing, customers are generally more receptive and more readily persuaded to purchase a product. Relevant content that speaks to an individual need that will help form a personal connection with the host financial institution via its mobile application, website, or other property, or any other suitable channel, including third-party channels (e.g., partner apps, websites, and other properties).

In one embodiment, a "scavenger hunt" may be performed using geolocation. For example, challenges and/or tasks may be located near predetermined locations in the customer's geographical location. The incentive may be in the form of an offer, imaginary currency/point system, badges, etc. The scavenger hunt may be run continuously, during high volume shopping seasons, etc. In one embodiment, incentives may be limited, and a single incentive could become in high demand because of scarcity.

In one embodiment, challenges and/or tasks may be "daisy chained." As the customer completes a challenge to receive an incentive, a subsequent challenge that builds on the earlier offer may be provided. For example, if the customer is offered a 5% discount for shopping with a certain merchant, the customer may be offered an increased incentive (e.g., 10%) for conducting the same transaction with the merchant. The incentives may increase up to a certain point as is necessary and/or desired.

In one embodiment, if the customer does not conduct a transaction within a predetermined period, the incentives may be reset to the base incentive.

In another embodiment, the customer may be rewarded for "streaks." For example, a challenge may be for a customer to read five articles for six consecutive months in order to receive an incentive.

As another example, offer 1 may be set in January for the customer to receive 10% off with a minimum spend of $50 with a merchant. Offer 2 may be available in February to customers that redeemed Offer 1 and had a minimum spend of $100 in January. Offer 2 may provide 15% off with a minimum spend of $150. Offer 3 in March may then build on offer 2 targeted only to customers that redeemed offer 2.

The incentive amount may be manually set, or machine learning may be used to predict an incentive amount that would encourage participation. The incentive amount may vary for each customer.

In step 220, customers may be dynamically matched to the challenge based on the dynamic customer profiles. For example, dynamic customer profiles may be reviewed to identify customers to which the challenge would apply. This may be based on, for example, location, past transactions, past interactions (e.g., using the mobile application, website, or other features), etc.

In one embodiment, machine learning algorithms may be applied to improve the matching. For example, using location data, merchant categories and frequency of transactions, machine learning may be used to predict the type of incentives that would motivate different customer segments.

In one embodiment, challenges may be targeted to customers based on the customer's behavior attributes. For example, the customer's spending activity without using the mobile payment application may be used to target challenges based on use of the mobile payment application. For example, if a customer uses a credit card to purchase coffee each morning, the customer may be provided with a challenged to purchase coffee using a digital wallet, resulting in a discount.

In one embodiment, the challenge and/or the incentive may be dynamic, including issuing a subsequent challenge at the completion of a challenge.

In step 225, the challenge may be issued to the customers. The challenge may be issued to a customer's mobile device (e.g., text message, push messaging, in-app messaging, etc.), via an account on a website, etc. The method of notification or messaging with the customer may be dynamically determined. For example, if the customer is using the mobile payment application, an in-app message may be provided. If the customer is not using the mobile payment application, the customer may be sent a push message. Other bases for determining the type of notification (e.g., geolocation of the mobile device, other activity being performed on the mobile device (e.g., the current screen being viewed), the time of day, customer preferences, etc. may be used as is necessary and/or desired.

In one embodiment, the opening screen provided when the customer launches the mobile application may be dynamically determined. For example, the opening screen may be based on prior activity, time of day, geolocation of the mobile device, other activity on the mobile device (e.g., other applications being executed, browsing history, recent messaging, etc.).

In another embodiment, the customer may not be advised of a challenge and/or the component tasks. For example, when the customer performs a challenge and/or a task, the customer may be "surprised" with a reward.

In embodiments, if the customer is logged in to the mobile payment application and unknowingly completes a challenge and/or task, a reward may be presented, for example by in-app messaging, by push, by email, etc. and the details of the challenged may be provided. If the customer is not logged in if the customer is not logged in to the mobile payment application and unknowingly meets a challenge and/or task, a push notification may be provided, and the customer may launch the mobile payment application. The customer may log in, and may be presented with the reward.

In one embodiment, customers may be provided with messaging that indicate that similarly situated customer have save a certain amount using the mobile payment application. This may be based on specific transactions conducted with the customer without using the mobile payment application, or it may be based on rewards and/or discounts earned by customers having similar spending patterns.

In step 230, the customers responses to the challenge may be tracked. For example, the organization's mobile application may track the customer's response to the issuance of the challenge (e.g., time spent reviewing, actions taken, etc.), whether and how long it takes for the customer to complete a task, etc. It may also track customer location and activity, such as which channel (e.g., mobile application, website, phone, in-person, etc.) the customer uses, the time of day, etc.

In one embodiment, a task may involve set-up, and the point at which the customer stopped may be identified. For example, if the task is to turn on a go paperless feature, and the customer did not complete the task, the point at which the customer abandoned the task may be identified.

In addition, any organization system (e.g., authorization, transaction, etc.) may provide information as is necessary and/or desired.

In step 235, once the customer has completed, the customer may be issued the reward. In one embodiment, the customer may receive a free or discounted item, cash back, reward points, a discount on a future purchase, a virtual badge (e.g., an "App Explorer" badge), product bundles with a discount (e.g., free checking, discounted credit card rates, etc.), etc.

In one embodiment, partial rewards may be issued at certain parts of the challenge (e.g., completion of two tasks), etc.

In one embodiment, the customer may have the opportunity to select specific reward types using the mobile payment application. For example, the customer may be able to select specific reward points (e.g., merchant-specific rewards) instead of generic issuer-based rewards.

In embodiments, the customer may decline the reward or discount, and have a donation made to a charity of the customer's choosing.

In one embodiment, the rewards may be automatically added to the customer's account. In one embodiment, a link may be provided that allows the customer to share a message via social media.

In step 240, based on the customer's performance, the customer's dynamic profile may be updated. For example, weightings for certain elements in the customer's dynamic profile may be adjusted based on whether the customer responded to the challenge, how the customer responded to the challenge (e.g., if the customer responded, if the customer exited, how long it took for the customer to respond, the time of day that the customer responded, the location at which the customer responded), the activity preceding the customer's response and the activity following the customer's response, etc. Any other information may be gathered and applied to weighting as is necessary and/or desired.

In step 245, the challenge data may also be updated based on the customers' responses. For example, if a small percentage of customers completed the challenge, the tasks may be revised to make them more appealing, the incentive may be modified, the sequencing may change, etc.

It should be recognized that although several different embodiments are disclosed, these embodiments are not exclusive. Thus, although certain features may be disclosed in the context of one embodiment, the features may be used any embodiment as is necessary and/or desired.

Hereinafter, general aspects of implementation of the systems and methods of the embodiments will be described.

The system of the embodiments or portions of the system of the embodiments may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, ADA, APL, Basic, C, C++, COBOL, dBase, Forth, Fortran, Java, Modula-2, Pascal, PROLOG, REXX, VISUAL BASIC, and/or JAVASCRIPT, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A method for gamification-based engagement, comprising:

in a financial institution information processing apparatus comprising at least one computer processor:
  receiving, from a plurality of data sources, customer activity data, wherein:
    the customer activity data comprises customer engagement behavioral data and customer transactional data for a customer, and
    the customer engagement behavioral data comprises customer engagement behaviors including interaction of the customer with a financial institution computer application and/or a financial institution website;
  aggregating the customer activity data;
  generating a dynamic customer profile for the customer based on the aggregated customer activity data;
  predicting, by using a machine learning algorithm, a plurality of component tasks that are associated with increasing at least one of the customer engagement behaviors;
  generating challenge data that defines a challenge comprising the plurality of component tasks, an order in which the tasks are to be completed, and an incentive for completing the tasks;
  grouping the customer into a customer segment including processing the dynamic customer profile with a machine learning algorithm to identify the customer segment;
  dynamically matching the customer to the challenge, wherein the dynamically matching the customer comprises predicting, by a machine learning algorithm, a type of challenge and a type of the incentive based on the identified customer segment;
  issuing the challenge to the customer on a mobile electronic device of the customer;
  tracking at least one response of the customer to the challenge;
  weighting elements included in the dynamic customer profile based on machine learning, wherein the machine learning processes the at least one response of the customer to the challenge;
  updating the dynamic customer profile of the customer based on the weighted elements, including adjusting a weighting for the customer transactional data and the customer engagement behavioral data; and
  issuing the customer a reward based on the incentive for completing the challenge.

2. The method of claim 1, further comprising:
updating the challenge data based on the at least one response of the customer to the challenge.

3. The method of claim 1, wherein the dynamic customer profile is further based on a circumstantial data.

4. The method of claim 1, wherein machine learning is used to predict an incentive that encourages the customer engagement behavior.

5. The method of claim 1, wherein the customer is notified of the challenge after the plurality of tasks are completed in the order.

6. The method of claim 1, wherein the customer's response to the challenge comprises at least one of a customer time spent reviewing the challenge, acceptance or rejection of the challenge, an action taken prior to responding to the challenge, and an action taken after responding to the challenge.

7. A system for gamification-based engagement, comprising:
a plurality of data sources, each of the data sources providing customer actiMty data;

a challenge database; and a financial institution computer processor executing a computer program performing the following:

receive, from the plurality of data sources, customer activity data, wherein:
- the customer activity data comprises customer engagement behavioral data and customer transactional data for a customer, and
- the customer engagement behavioral data comprises customer engagement behaviors including interaction of the customer with a financial institution computer application and/or a financial institution website;

aggregate the customer activity data;

generate a dynamic customer profile for the customer based on the aggregated customer activity data;

predict, by using a machine learning algorithm, a plurality of component tasks that are associated with increasing at least one of the customer engagement behaviors;

generate challenge data that defines a challenge from the challenge database comprising the plurality of component tasks, an order in which the tasks are to be completed, and an incentive for completing the tasks, wherein at least one of the plurality of tasks is associated with increasing one of the customer engagement behaviors;

group the customer into a customer segment including processing the dynamic customer profile with a machine learning algorithm to identify the customer segment;

dynamically match the customer to the challenge, wherein dynamically matching the customer comprises predicting by a machine learning algorithm, a type of challenge and a type of the incentive based on the identified customer segment;

issue the challenge to a customer mobile electronic device;

track at least one response of the customer to the challenge;

weight elements included in the dynamic customer profile based on machine learning inputs, wherein the machine learning inputs include the at least one response of the customer to the challenge;

update the dynamic customer profile based on the weighted elements, including adjusting a weighting for the customer transactional data and the customer engagement behavioral data; and issue the customer a reward based on the incentive for completing the challenge.

\* \* \* \* \*